United States Patent [19]
Byrd et al.

[11] Patent Number: 4,864,467
[45] Date of Patent: Sep. 5, 1989

[54] UTILITY METER PEDESTAL

[75] Inventors: Curtis W. Byrd, Englewood, Fla.; Jerry D. Byrd, Sterling Heights, Mich.

[73] Assignee: H & M Manufacturing Company, Sterling Heights, Mich.

[21] Appl. No.: 233,811

[22] Filed: Aug. 19, 1988

[51] Int. Cl.⁴ .............................................. H02B 1/04
[52] U.S. Cl. .................................... 361/369; 361/364; 174/38; 174/45 R; 174/48; 29/700; 29/729; 29/739
[58] Field of Search ............... 361/331, 332, 344, 364, 361/369, 370, 371, 372, 373, 417, 419, 420, 427; 174/37, 38, 45 R, 51, 48; 29/854, 825, 592.1, 700, 729, 739

[56] References Cited
U.S. PATENT DOCUMENTS

| | | | |
|---|---|---|---|
| 3,868,080 | 2/1975 | Olson | 174/38 X |
| 3,879,641 | 4/1975 | Byrd | 361/369 |
| 4,751,610 | 6/1988 | Nickola | 361/369 |

Primary Examiner—A. D. Pellinen
Assistant Examiner—David Osborn
Attorney, Agent, or Firm—Krass & Young

[57] ABSTRACT

A utility meter mounting pedestal for use in providing underground utility service, particularly electric service, to a construction site after a foundation has been constructed but before a building has been erected upon the foundation. The pedestal comprises a vertical L channel post, flat steel upper and lower plates secured to the post at the opposite ends thereof. The upper plate carries a utility meter box and the lower plate is nailed to the front surface of the building foundation. A foundation anchor strap is adjustably secured to the post between the ends thereof and is nailed to and in overlying relationship with the top surface of the foundation.

14 Claims, 3 Drawing Sheets

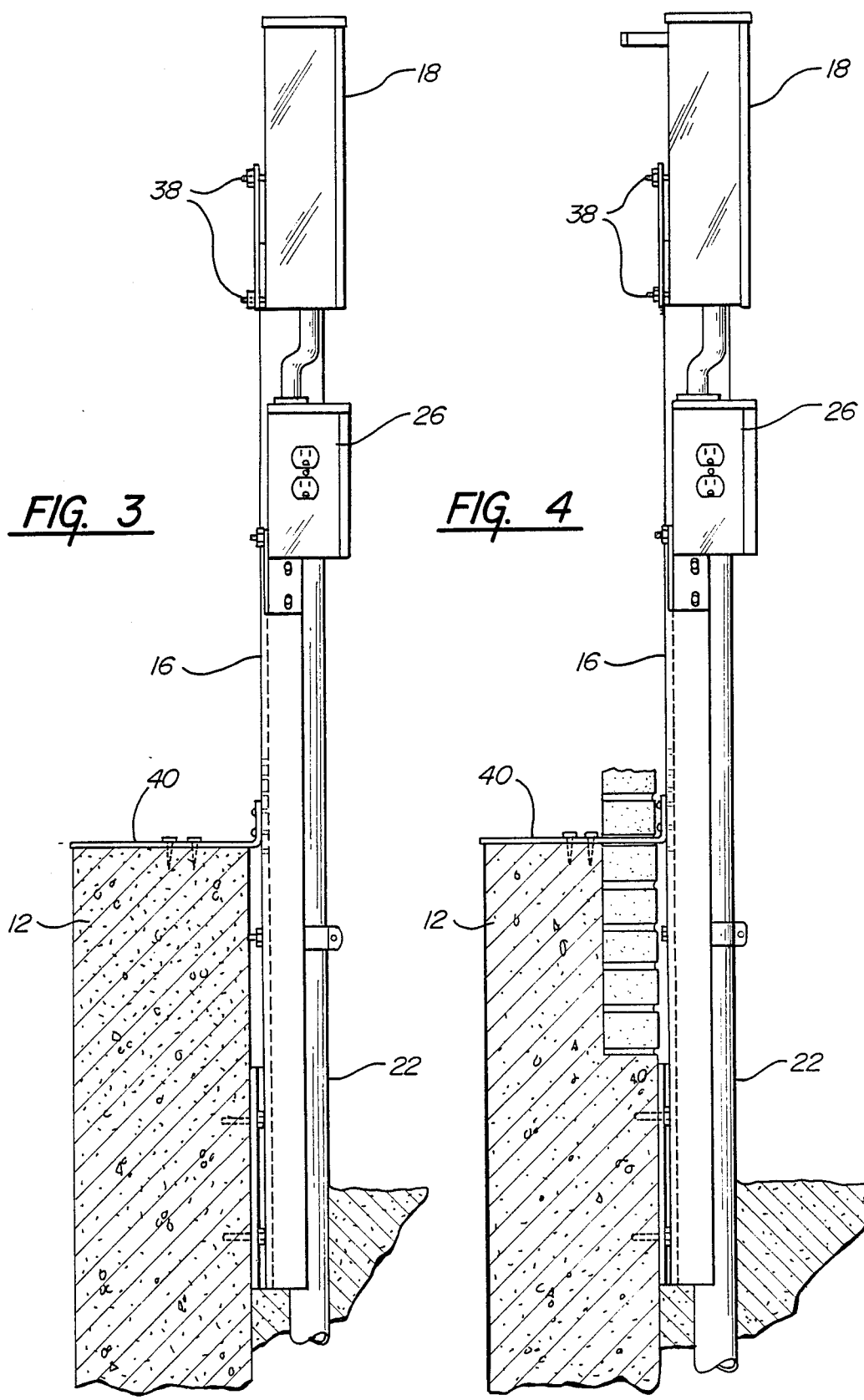

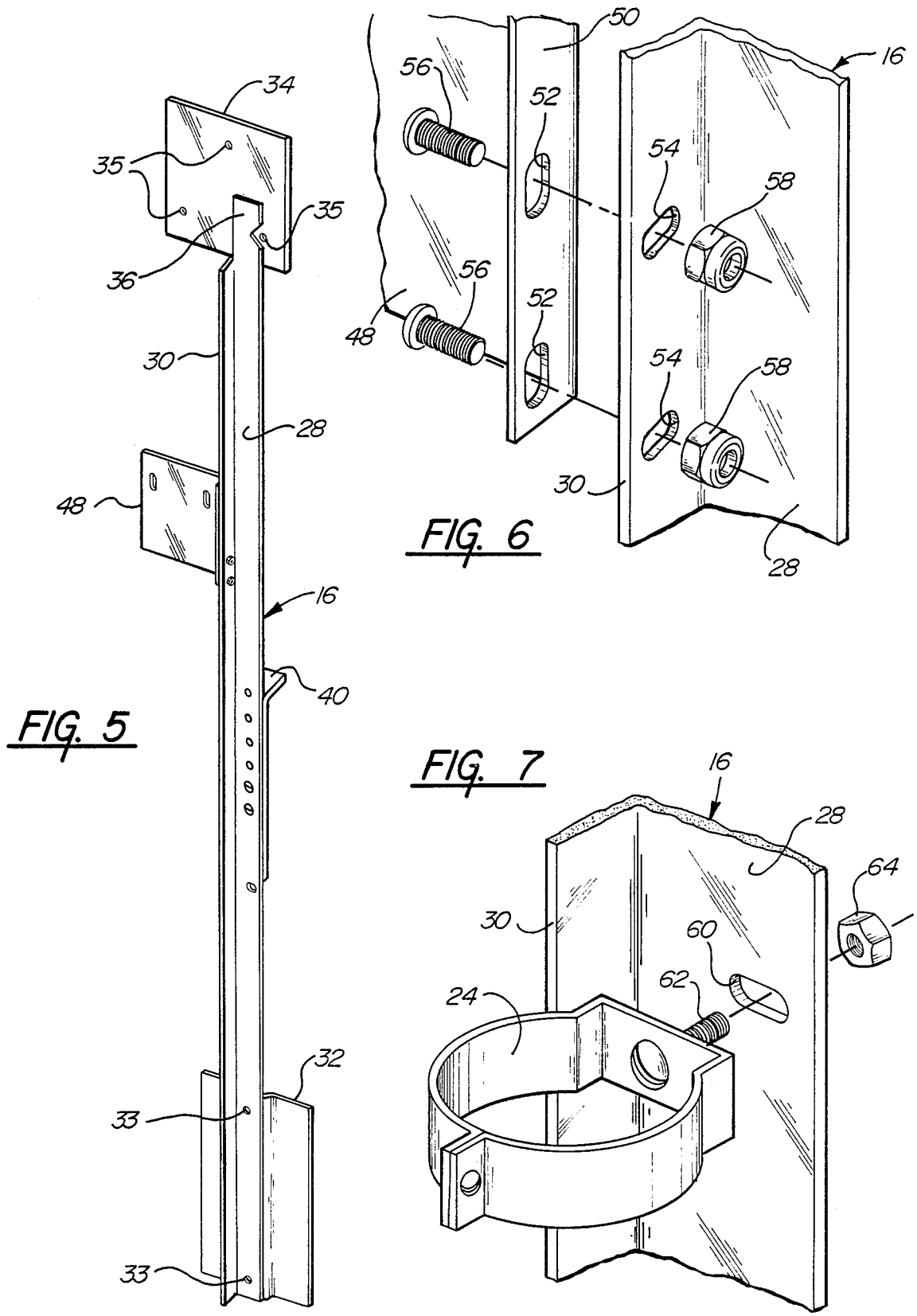

UTILITY METER PEDESTAL

INTRODUCTION

This invention relates to mounting apparatus, commonly called "pedestals," for utility service meters and particularly to a meter pedestal adapted to be mounted on the front face of a building foundation prior to the erection of a building thereon such that an underground utility service line may be connected to a meter on said pedestal.

BACKGROUND OF THE INVENTION

U.S. Pat. No. 3,879,641 issued Apr. 22, 1975 to Curtis W. Byrd discloses a utility meter pedestal which is adapted to be mounted on a building foundation prior to the erection of a building on said foundation That patent discloses the advantages of providing metered utility service, especially electrical power, at the building site during the construction phase and in providing a pedestal for the utility meter which neither interferes with the final construction of the building on the foundation nor requires removal and reinstallation of the meter once the building reaches the final stages of construction.

U.S. Pat. No. 3,879,641 discloses two different pedestals, both comprising vertical posts in the form of relatively wide steel plates having parallel edge flanges, the bottoms of which are adapted to rest on a brick ledge. In one embodiment, the meter box is fastened to a small seat bracket which extends forwardly at right angles to the post plate and at the top of the post plate; i.e., the meter mounting block sits on top of this bracket and is preferably secured thereto by threaded fasteners or rivets.

U.S. Pat. No. 3,879,641 also discloses a strap which is secured to the pedestal post between the ends thereof and which is adapted to overlie the top and inside surfaces of the building foundation to assist in the proper positioning and securement of the pedestal post to the foundation during installation and construction phases.

BRIEF SUMMARY OF THE INVENTION

The principal objective of the present invention is to provide an improved meter pedestal and an improved meter pedestal installation method, both of which provide superior installation integrity, increased safety and reduced cost in the construction and installation of a foundation mount utility meter pedestal of the type which is generally disclosed in the aforementioned U.S. Pat. No. 3,879,641.

In general, the improved utility meter pedestal comprises a simplified, rigid, vertical post, preferably a steel channel having an L-shaped cross section, to which top and bottom steel plates are secured in essentially parallel planes, the bottom plate ultimately lying flush against the front face of the building foundation at a below grade location and being fastened, such as by power driven nails, to said front face during the installation process. The upper plate is preferably secured to one of the legs of the L-shaped post section in partially overlapping relationship. The preferred method of attachment between the posts and the upper plate is spot welding. The upper plate receives the back of the utility meter box or housing against the front face thereof and, in the preferred installation, the forward leg of the post L is trimmed away so that it terminates below the top of the post. The utility meter box, in addition to being secured by threaded fasteners or the like to the top plate, rests on the upper terminus of the fore-shortened post leg. This provides a substantially improved and totally secure attachment of the utility meter box to the pedestal post. In addition the apparatus comprises a strap which is preferably securable to the rear surface of the metal post in any of several locations substantially between the upper and lower plates and which strap extends rearwardly from the post at essentially right angles. In the secured or installed condition, the strap overlies the top of the foundation and is secured, preferably by power driven nails, to the top of the foundation to permanently hold the meter pedestal post in place.

The utility meter pedestal of the present invention also lends itself readily to the provision of temporary electrical utility service during the construction of a building on the foundation to which the utility meter pedestal post is attached. This is achieved through the installation of a third intermediate plate on and to one of the legs of the post L, which plate is adapted to receive a temporary outlet box which may be wired to the meter and to the electrical service for availability during the construction phases of the ultimate building.

In the preferred embodiment the utility meter pedestal of the present invention readily accommodates both brick and siding construction. At least in the case of brick, the bottom plate is secured to an exposed, below grade portion of the foundation which is also the brick ledge. In the case of siding, the bottom plate of the pedestal is preferably configured to space the rear leg of the pedestal post forwardly of the front face of the foundation by a sufficient distance to permit siding to be installed on the exterior building walls without undue interference from the utility meter post.

BRIEF DESCRIPTION OF THE DRAWING

FIG. 3 is a side view of the utility meter pedestal of FIG. 2 when installed on a building foundation and in anticipation of the installation of siding on the exterior walls of the building to be erected on the foundation;

FIG. 4 is a side view of the utility meter pedestal of FIG. 2 installed on a building foundation having a brick ledge;

FIG. 5 is a front perspective view of the utility meter pedestal of FIG. 2 but without the utility meter box, the temporary outlet box and the utility service conduit;

FIG. 6 is an exploded perspective view of a detail of FIG. 5 showing the manner in which the temporary outlet box mounting plate is secured to the pedestal post; and FIG. 7 is an exploded perspective view of another detail of the utility meter pedestal indicating the manner in which the service conduit strap is secured to the post.

DETAILED DESCRIPTION OF THE SPECIFIC, ILLUSTRATIVE EMBODIMENTS

Figure 1:
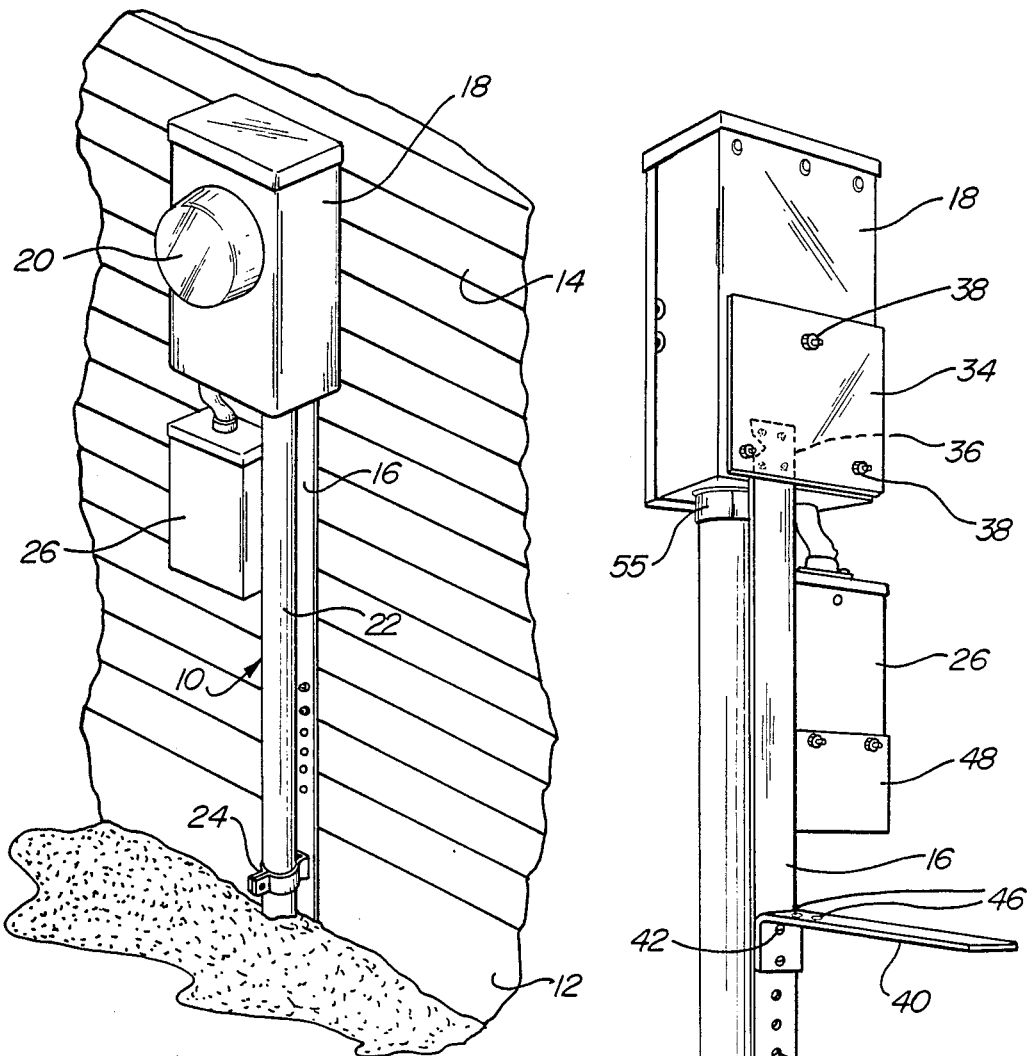
FIG. 1 is a perspective view of a utility meter pedestal which is constructed and installed on a finished building with siding and in accordance with the present invention.
Figure 2:
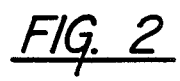
FIG. 2 is a perspective view from the rear of a utility meter pedestal complete with meter box and temporary outlet box also constructed in accordance with the invention.
Figure 2:
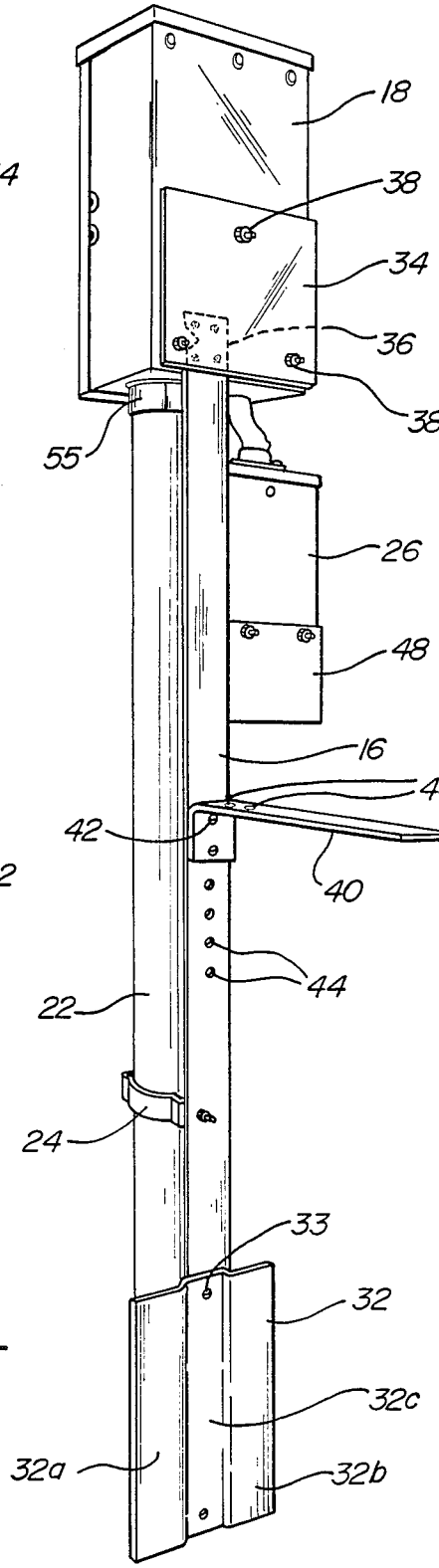

Referring first to FIG. 1, a utility meter pedestal 10 is mounted on the poured concrete foundation 12 of a building, the exterior walls of which are covered with standard and conventional aluminum siding 14. Pedestal 10 comprises a rigid steel vertical post 16 to which and on which is mounted a metal utility meter box 18 for a conventional utility meter having a glass face 20 which protrudes forwardly through the front face of the box 18. A plastic conduit 22 extends in parallel spaced relationship with the post 16 and contains the electrical service line from an underground utility to the meter 20 in the box or housing 18. Conduit 22 is secured in part to the pedestal post 16 by means of a clamp bracket 24. A temporary electrical outlet box 26 is mounted on the pedestal post 16 and electrically connected to the meter 20 in box or housing 18 to provide metered electrical power during the construction of the building which rests on the foundation 12. The temporary outlet in the box 26 may thereafter be removed.

Referring now to FIGS. 2–7, the details of the pedestal 10 will be described in detail. Post 16 is preferably an L-shaped steel channel having integral legs 28 and 30 which define an included angle of 90 degrees. The plane of leg 28, in the installed condition, is parallel to the front face; i.e., the outside face, of the foundation 12 and the plane of leg 30 is essentially orthogonal thereto. The length of the post 16 is such as to be capable of extending from a point below grade on the foundation 12 to a point which is substantially above the top surface of the foundation 12 as is best shown in FIGS. 3 and 4. Lengths on the order of 5 to 6 feet have been found satisfactory.

A first plate, also hereinafter referred to as a bottom plate, 32 is secured by conventional fasteners 33 to the leg 28 of the post 16 adjacent the bottom or lower end thereof. Plate 32 is preferably configured to provide coplanar, flat mounting surfaces 32a and 32b which are rearwardly offset from the center portion 32c for the purpose of causing the post 16 to be spaced out from the front face of the foundation 12 as hereinafter described in greater detail. Plate 32 may be on the order of 10 to 14 inches in height and approximately 6 to 8 inches in width. Galvanized steel having a thickness on the order of ⅛ inch has been found satisfactory. Rivets or spot welds may also be substituted for the threaded fasteners 33.

A top plate 34 is secured by spot welds to the post 16 adjacent the top end thereof. This is preferably achieved by trimming the leg 30 of the post 16 near the top, as shown in FIG. 5, so that the plate 34 overlaps only the upwardly extending terminal end 36 of the leg 28. The overlapping upper end 36 of post leg 28 is notched to provide clearance for one of several holes 35 which receive fasteners 38 for the purpose of securing the meter box 18 to the front face of the plate 34. In the preferred configuration, the meter box 18 rests on the top edge of the trimmed leg 30 of post 16. The leg 30, therefor, is preferably trimmed at a point which corresponds to the lower edge of the plate 34 when welded to the overlapping portion 36 of back leg 28 of post 16. The planes of plates 32 and 34 are parallel if not coextensive.

A foundation anchor strap 40 is fastened by screws 42 in linearly spaced holes 44 in the leg 28 of pedestal post 16 between the positions of plates 32 and 34. Strap 40 is preferably formed from an L-shaped length of ⅛ inch galvanized soft steel and comprises a rearwardly extending flat leg which extends over and lies on the top exposed surface of the foundation 12 as best shown in FIGS. 3 and 4. The several linearly spaced holes 44 permit the foundation anchor strap 40 to be mounted on the post in any of several locations to accommodate different foundation dimensions as hereinafter described. A second set of holes 46 in the longer leg of the strap 40 permit the strap to be secured to the back surface of post 16 with the longer leg of the anchor strap 40 flush against the post leg 28. This is the preferred assembly for shipping purposes. When the time comes to install the post 16 on a foundation 12, the foundation anchor strap 40 is removed and reinstalled into the position shown in FIGS. 3, 4 and 5.

As best shown in FIG. 6, a third plate 48 having an edge flange 50 is secured to the orthogonal leg 30 of the pedestal post 16 for the purpose of carrying or supporting the temporary outlet box 26. Holes 52 are formed in the edge flange 50 of the plate 48 and match up with holes 54 which are formed in the orthogonal flange 30 of the pedestal post 16 thereby to receive screws 56 Which are secured by nuts 58. Holes 52 are elongated in the vertical dimension for adjustment purposes of the plate 48 relative to the post 16 in the vertical direction and holes 54 are elongated in the fore and aft direction to permit adjustment of the position of plate 48 relative to post 16 in the orthogonal plane.

FIG. 7 shows the manner in which the clamp bracket 24 is secured to the post 16. A laterally elongated hole 60 is formed in the post leg 28 to receive screw 62 which, along with nut 64, secures the conduit clamp bracket 24 to the post 16.

Operation/Installation

The method of installing the pedestal 10 will now be described with reference to all of the figures and with the understanding that FIG. 3 represents a typical installation on a foundation which is to receive a building having siding, and FIG. 4 represents the installation of the device on a foundation having a conventional brick ledge.

The post 16 is first assembled: the top plate is preferably welded to leg 28 of post 16 at the factory in the preferred location. Similarly, the bottom plate 32 is secured by fasteners, spot welds or rivets to the leg 28 of post 16 at the factory. However, it is preferable to secure the bottom plate 32 to the post 16 by screws so as to permit the selection of either a flat plate (not shown) or the offset plate shown in FIGS. 2 and 5, depending on whether the building is to receive siding. The foundation anchor bracket 40 is released from the post 16 if in the shipping position of FIG. 5 and is reinstalled in the appropriate set of holes 44 for installation on the foundation 12.

A portion of the foundation 12 below grade is preferably exposed by excavation in the immediate vicinity of the underground utility service line. The installer places the post 16 against the foundation with the post in a vertical orientation; a carpenter's level is preferably used to determine that the post is perfectly vertical in both lateral and fore and aft planes. The plate 32 is flush against the exposed outside face of the foundation 12, usually below grade, and the bracket 40 rests on top of the foundation as shown in FIGS. 3 and 4. After again checking for the plumb condition, a power-driven nail gun is preferably used to permanently secure the plate 32 and the bracket or strap 40 to the front and top surfaces, respectively, of the foundation 12.

Prior to the installation step described immediately above, the back surface of the meter box 18 is secured by threaded fasteners 38 to the front face of the plate 34. Conduit 22 is secured by strap 24 to the post 16 and by plastic coupling 55 to the bottom of the meter box 18 in a conventional manner. If temporary service is to be provided, plate 48 is secured to the post 16 in the manner described with reference to FIG. 6, and the outlet box 26 is thereafter properly located on plate 48. The electrician finally threads the electric utility service lines upwardly through conduit 22 and makes the appropriate electrical connections to the meter 20 and to the outlet box 26.

The building which is to be erected on foundation 12 may thereafter progress in the normal fashion without undue interference from the preinstalled condition of the pedestal post 16 and the various accessories thereon described immediately above. The multiplanar bottom plate 32 is used in the case of a building to receive siding to space the pedestal post 16 forwardly from the foundation by approximately ½ inch. Strap 40 is of such length as to readily accommodate a foundation having a brick ledge as shown in FIG. 4.

We claim:

1. A method of installing a utility meter support on a building foundation of the type having a vertical outside face at least a part of which is exposed below grade level and exposed horizontal top surface, wherein said meter support comprises a rigid post of sufficient length to extend vertically both below grade and above said horizontal top surface, a rigid plate affixed to the post near the bottom and a flat rigid strap fixed at an intermediate position along the post and extending rearwardly therefrom at essentially a right angle, wherein the method comprises the steps of:

(A) placing the post in a vertical orientation against the outside face of the foundation such that the plate lies against and parallel to the foundation face at a below grade location and the strap rests on the top surface of the foundation;

(B) fastening the plate to the foundation; and (C) fastening the strap to the foundation.

2. The method defined in claim 1 wherein the steps of fastening the plate and the strap are carried out by nailing through the plate and strap, respectively, into the foundation.

3. The method defined in claim 1 comprising the further step of securing a utility meter housing to the top of the post.

4. The method defined in claim 3 comprising the further step of placing a utility meter within the housing and, after the installation steps, connecting the meter to an underground electrical service line.

5. A utility meter support for use with underground utility service and of the type which is adapted to be mounted on a building foundation having a top surface and front face prior to the erection of a building on said foundation wherein said support comprises:

a rigid post of such length as to extend vertical both below grade and above the top surface of said foundation when installed thereon;

a rigid plate secured to the post adjacent the bottom end thereof and lying in a plane which is essentially parallel to the front face of said foundation when mounted thereon;

a rigid flat strap secured to said post between ends thereof and extending rearwardly therefrom at essentially a right angle thereto; and a flat meter box mounting plate permanently secured to the post adjacent the top end thereof and in parallel overlapping relationship with a portion thereof to receive a utility meter mounting box flush against the front surface of said plate; said bottom plate and said strap, in an installed condition, lying against and being secured to the front face and the top surface, respectively, of said foundation.

6. The apparatus defined in claim 5 wherein the plate is configured to space the post forwardly from the foundation face a sufficient distance to permit siding materials to be placed between the foundation face and the post.

7. The apparatus defined in claim 5 wherein the foundation exhibits a brick ledge at approximately grade level.

8. Apparatus as defined in claim 5 wherein said post is fabricated from metal and exhibits an L-shaped cross section, one of the legs of the L extending parallel to the bottom plate and to the front face of the foundation, and the other leg of the L lying at a right angle thereto.

9. Apparatus as defined in claim 8 further including an electrical utility meter mounting box (housing) secured to the front face of the upper plate, said other leg of the L terminating below said one leg of said L thereby to underlie the utility meter mounting box.

10. Apparatus as defined in claim 8 wherein the top plate is welded to the overlapping portion of the post.

11. Apparatus as defined in claim 5 wherein the bottom plate is configured to space the post forwardly from and parallel to the front face of the foundation in the installed condition.

12. Apparatus as defined in claim 5 further comprising a utility meter housing secured to the front face of said upper plate, and a service line conduit secured to and extending vertically from the utility meter housing in parallel spaced relationship to said post.

13. Apparatus as defined in claim 12 further including a third plate secured to the post at an intermediate position spaced vertically above the location of said strap and extending substantially parallel to the planes of both the upper and lower end plates.

14. Apparatus as defined in claim 13 further comprising a temporary utility outlet installed on said intermediate plate and electrically connected to the service line and to said meter.

* * * * *